(12) United States Patent
Wu

(10) Patent No.: US 10,901,859 B2
(45) Date of Patent: *Jan. 26, 2021

(54) AUTOMATED DEVELOPMENT OF RECOVERY PLANS

(71) Applicant: Rubrik, Inc., Palo Alto, CA (US)

(72) Inventor: Di Wu, East Palo Alto, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/287,087

(22) Filed: Feb. 27, 2019

(65) Prior Publication Data

US 2019/0266058 A1 Aug. 29, 2019

Related U.S. Application Data

(60) Provisional application No. 62/635,673, filed on Feb. 27, 2018.

(51) Int. Cl.
*G06F 11/14* (2006.01)
*G06F 9/38* (2018.01)
*G06F 16/901* (2019.01)
*G06F 17/18* (2006.01)
*G06F 9/455* (2018.01)
*H04L 12/24* (2006.01)

(52) U.S. Cl.
CPC ........ *G06F 11/1469* (2013.01); *G06F 9/3838* (2013.01); *G06F 9/45558* (2013.01); *G06F 16/9024* (2019.01); *G06F 17/18* (2013.01); *H04L 41/0654* (2013.01); *H04L 41/12* (2013.01); *H04L 41/142* (2013.01); *H04L 41/145* (2013.01); *G06F 2009/45591* (2013.01)

(58) Field of Classification Search
CPC .............. G06F 11/1469; G06F 9/3838; G06F 16/9024; G06F 17/18; G06F 9/45558; G06F 2009/45591; G06F 11/14; H04L 41/0654; H04L 41/12; H04L 41/142; H04L 41/145; H04L 41/5006; H04L 43/022; H04L 41/082; H04L 41/0886
See application file for complete search history.

(56) References Cited

U.S. PATENT DOCUMENTS 7,386,752 B1 * 6/2008 Rakic .................. G06F 11/1469
714/2
2016/0357424 A1 * 12/2016 Pang ................. G06F 16/24578
2019/0268216 A1 8/2019 Wu

OTHER PUBLICATIONS

U.S. Appl. No. 16/287,167, filed Feb. 27, 2019, Automated Development of Recovery Plans.
"U.S. Appl. No. 16/287,167, Non Final Office Action dated May 4, 2020", 11 pages.

* cited by examiner

*Primary Examiner* — Thai Nguyen
(74) *Attorney, Agent, or Firm* — Schwegman Lundberg & Woessner, P.A.

(57) ABSTRACT

An automated system monitors network traffic to determine dependencies between different machines. These dependencies can be used to automatically develop a recovery plan for the machines, for example restoring servers in a certain order. This approach can also automatically adjust the recovery plan for changes in system configuration, for example as different servers come online or are taken offline or change their roles.

6 Claims, 17 Drawing Sheets

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| ... | | |

FIG. 3A

Job Queue 224

| job_id | start_time | job_type | job_info |
|---|---|---|---|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| ... | | | |

FIG. 3B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | ... |

Image Table 228

| im_id | im_location |
|---|---|
| m001.im1 | ... |
| m001.im1-2 | |
| m001.im2-3 | |
| m001.im3-4 | |
| m001.im4-5 | |
| ... | |

FIG. 3C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, . . ., m001.im4-5 |
| m001.ss6 | 20171002.0900 | |
| . . . | . . . | . . . |
| m001.ss12 | 20171003.2100 | m001.im1, . . ., m001.im11-12 |

Image Table 228

| im_id | im_location |
|---|---|
| m001.im1 | . . . |
| m001.im1-2 | |
| m001.im2-3 | |
| m001.im3-4 | |
| m001.im4-5 | |
| m001.im5-6 | |
| . . . | |
| m001.im11-12 | |

FIG. 4A

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | ... |
| ... | | |
| m001.ss12 | 20171003.2100 | m001.im1, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

FIG. 4B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ....., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |

FIG. 4C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |
| m001.im5-1 | |

FIG. 4D

Application Service Schedule 232

| application_user_id | application_id | machine_id | SLA |
|---|---|---|---|
| APP01 | a001 | m001, m002, m003 | standard application |
| APP02 | a002 | m004, m005 | short life |
| APP03 | a003 | m006, m007 | high frequency |
| APP04 | a004 | m008, m009, m001 | standard application |
| ... | | | |

FIG. 5A

Job Queue 224

| job_id | start_time | job_type | job_info | application_id |
|---|---|---|---|---|
| 00001 | 0300 | pull snapshot | target = m003 | APP01 |
| 00002 | 0300 | pull snapshot | target = m002 | APP01 |
| 00003 | 0300 | pull snapshot | target = m003 | APP01 |
| ... | | | | |
| 00010 | 0600 | pull snapshot | target = m004 | APP02 |
| 00011 | 0600 | pull snapshot | target = m005 | APP02 |
| ... | | | | |

FIG. 5B

Application Snapshot Table 236

| ss_id | ss_time | snapshot_child_list | snapshot_parent_list |
|---|---|---|---|
| app001.ss1 | 20171001.0300 | m001.ss1, m002.ss1, m003.ss1 | |
| m001.ss1 | 20171001.0300 | | app001.ss1 |
| m002.ss1 | 20171001.0300 | | app001.ss1 |
| m003.ss1 | 20171001.0300 | | app001.ss1 |
| app001.ss2 | 20171002.0300 | m001.ss2, m002.ss2, m003.ss2 | |
| m001.ss2 | 20171002.0300 | | app002.ss2 |
| m001.ss2 | 20171002.0300 | | app002.ss2 |
| m001.ss2 | 20171002.0300 | | app002.ss2 |
| ... | | | |

FIG. 5C

AUTOMATED DEVELOPMENT OF RECOVERY PLANS

CLAIM OF PRIORITY

This application claims the benefit of priority, under 35 U.S.C. Section 119(e), to Wu, U.S. Provisional Application No. 62/635,673, filed Feb. 27, 2018, entitled "AUTOMATED DEVELOPMENT OF RECOVERY PLANS", which is incorporated herein by reference in its entirety.

TECHNICAL FIELD

The present disclosure generally relates to managing and storing data, for example for application backup purposes.

BACKGROUND

The amount and type of data that is collected, analyzed and stored is increasing rapidly over time. The compute infrastructure used to handle this data is also becoming more complex, with more processing power and more portability. As a result, data management and storage are increasingly important. One aspect of this is reliable data backup and storage, and fast data recovery in cases of failure.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. However, various different platforms are offered for virtualization, including VMware, Microsoft Hyper-V, Microsoft Azure. GCP (Google Cloud Platform), Nutanix AHV, Linux KVM (Kernel-based Virtual Machine), and Xen.

In addition, modern enterprise software applications typically require multiple systems configured to work together as a collective entity. One simple example would be a proxy server, an application server, a database server, and a cache server working together to host an enterprise web application. The servers in this application group have dependencies on each other and, during disaster recovery operation, they must be recovered in the correct dependency order for the application to be operational.

Thus, there is a need for better approaches to managing and storing data, including developing recovery plans for complex software applications.

SUMMARY

In one aspect, an automated system monitors network traffic to determine dependencies between different machines. These dependencies can be used to automatically develop a recovery plan for the machines, for example restoring servers in a certain order. This approach can also automatically adjust the recovery plan for changes in system configuration, for example as different servers come online or are taken offline or change their roles.

One approach detects inter-system dependencies by using statistical sampling of network inflow and outflow. This can enable the following functions. First, given a subset of machines backing an application, detect and suggest additional machines that should be included in the recovery group. This can ease the requirement to painstakingly (and manually) catalog every machine in a large-scale system. Second, given a collection of machines, compute the dependency order of these machines. The intelligent detection of dependency relationships enables intelligent topological sorting of resources in a recovery plan and eases the burden of having to manually sequence recovery steps. Third, given an existing recovery plan, detect and alert the administrator if the production application system has been reconfigured in meaningful ways that would require the recovery plan to be updated. This could automatically suggest additions, removals, and re-ordering of machines in the recovery plan to ease the ongoing maintenance cost of up keeping recovery plans.

Other aspects include components, devices, systems, improvements, methods, processes, applications, computer readable mediums, and other technologies related to any of the above.

BRIEF DESCRIPTION OF THE DRAWINGS

FIGS. 3A-3C are DMS tables that illustrate operation of the system of FIGS. 1-2, according to one embodiment.

FIGS. 4A-4D are DMS tables that illustrate updating of snapshot images, according to one embodiment.

FIGS. 5A-5C are DMS tables that illustrate operation of the system of FIGS. 1-2 to manage and store data for an application, according to one embodiment.

DETAILED DESCRIPTION

Figure 1:
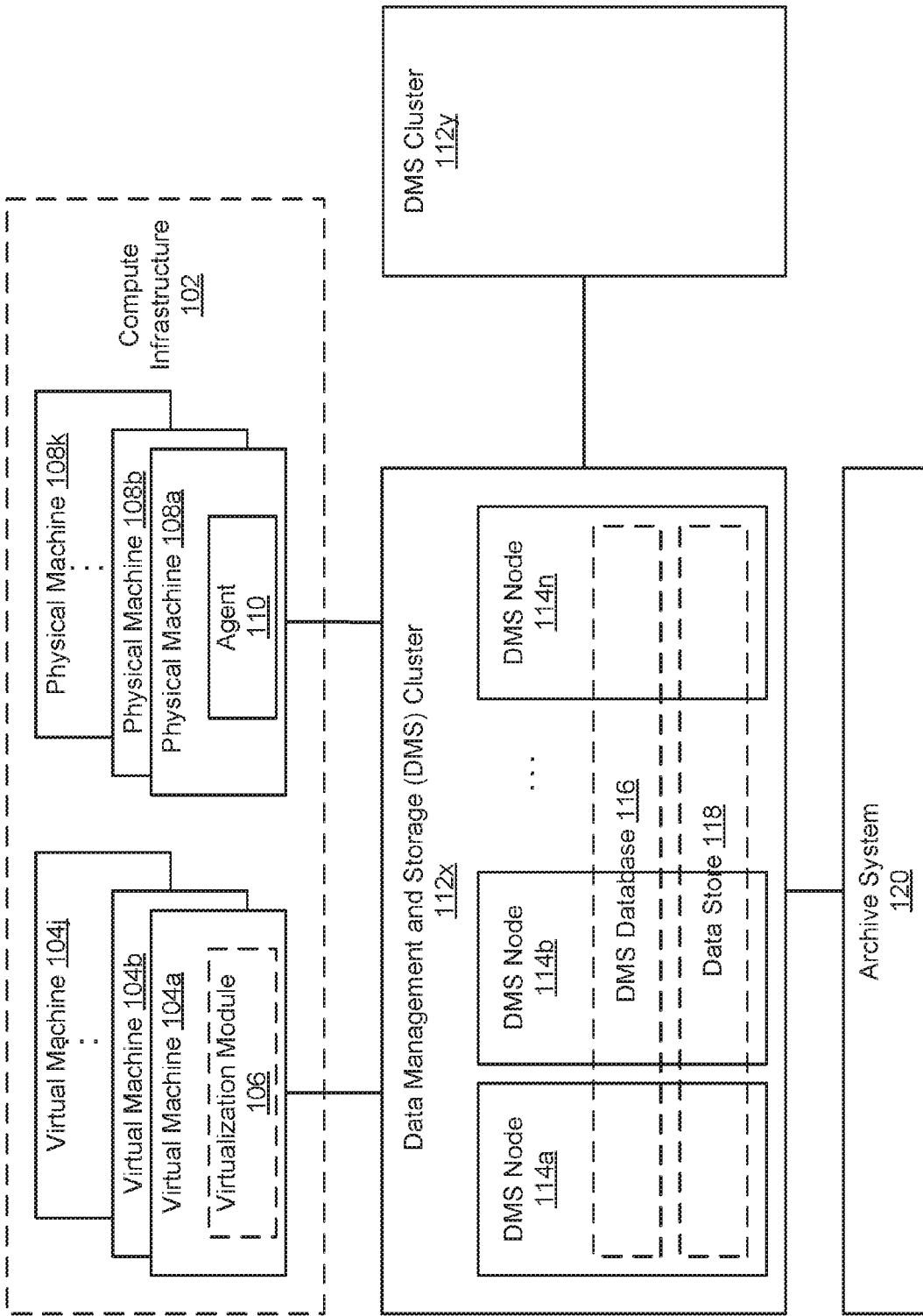
FIG. 1 is a block diagram of a system for managing and storing data, according to one embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A data management and storage (DMS) cluster of peer DMS nodes manages data for an application implemented across a set of machines of a compute infrastructure. The set of machines may include virtual machines, or physical machines. The application may execute on machines such as database servers, file servers, and web servers. The DMS cluster generates a snapshot of the application by generating synchronized snapshots of the set of machines. For example, a DMS node associates a set of machines with the application and generates data fetch jobs for the set of machines for execution by multiple peer DMS nodes. The data fetch jobs may be placed in a job queue, and the peer DMS nodes may retrieve jobs in the job queue for execution. The DMS node determines whether each of the data fetch jobs for the set of machines is ready for execution by the peer DMS nodes and enables the peer DMS nodes to execute the data fetch jobs to generate snapshots of the set of machines when each of the data fetch jobs is ready for execution. The snapshots may be full or incremental snapshots, and the snapshots of the set of machines collectively form a snapshot of the application. In addition to data fetch jobs, other types of DMS services such as recovery, replication, archival, or analytics services may be performed at the application level (i.e., for a set of machines associated with the application) rather than at the individual machine level.

For example, the DMS cluster (or a separate system) may also automatically determine which machines are used to implement the application and/or determine the order in which the machines should be recovered in case of a failure.

In one approach, machine dependencies are determined by collecting periodic statistics on incoming and outgoing established network connections. For example, every virtual machine in the infrastructure may be sampled every 30 minutes for the list of open and listening network ports to produce machine level network flow metadata. The raw network flow data can be collected in the following format:

For listening ports [local port] [process name]
For established (or open) connections [source IP address] [source port] [local port] [process name]

From this information, a directed graph of dependencies of machines in the infrastructure can be constructed. This will be referred to as a dependency graph. The nodes in the dependency graph are the individual machines, and the directed edges in the graph represent dependencies between two machines. The dependencies can be represented in forms other than a directed graph.

Note that not all network flow data are persistent, and the dependency relationship may change over time as the infrastructure evolves. Historical network flow data can be stored, and a weighted sum of the network relationships observed over the past N days can be used to calculate the current state of the global dependency graph. Each edge in the dependency graph represents the strength of the dependency and can be interpreted as a confidence level that the edge is an actual dependency.

In addition, certain observed network flow data may be spurious and not indicative of a true dependency, so intelligent thresholding algorithms can be applied to prune the number of spurious edges in the graph.

The dependency graph can be used to generate a recovery plan. For example, the dependencies between machines can be analyzed to determine which machines are used to implement applications and to determine the order of recovery of those machines. In one approach, the user seeds the process by identifying certain machines as a starting point. The set of machines can then be built out by traversing the dependencies in the graph. Human input can be used to further improve or guide this process.

In another use, the dependency graph can be used to validate a recovery plan. Inconsistencies between the dependency graph and the recovery plan of record may suggest areas where the recovery plan should be reviewed or updated.

The concepts described above will be explained using a specific backup architecture. This is for convenience, and the concepts are not limited to this specific architecture.

FIG. 1 is a block diagram illustrating a system for managing and storing data, according to one embodiment. The system includes a data management and storage (DMS) cluster 112x, a secondary DMS duster 112y and an archive system 120. The DMS system provides data management and storage services to a compute infrastructure 102, which may be used by an enterprise such as a corporation, university, or government agency. Many different types of compute infrastructures 102 are possible, Some examples include serving web pages, implementing e-commerce services and marketplaces, and providing compute resources for an enterprise's internal use. The compute infrastructure can include production environments, in addition to development or other environments.

In this example, the compute infrastructure 102 includes both virtual machines (VMs) 104a-j and physical machines (PMs) 108a-k. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108a-n can also use different operating systems running various applications. Microsoft Windows running Microsoft SQL or Oracle databases, and Linux running web servers are some examples.

The DMS cluster 112 manages and stores data for the compute infrastructure 102. This can include the states of machines 104, 108, configuration settings of machines 104, 108, network configuration of machines 104, 108, and data stored on machines 104, 108. Example DMS services includes backup, recovery, replication, archival, and analytics services. The primary DMS cluster 112x enables recovery of backup data. Derivative workloads (e.g., testing, development, and analytic workloads) may also use the DMS cluster 112x as a primary storage platform to read and/or modify past versions of data.

In this example, to provide redundancy, two DMS clusters 112x-y are used, From time to time, data stored on DMS cluster 112x is replicated to DMS cluster 112y. If DMS cluster 112x fails, the DMS cluster 112y can be used to provide DMS services to the compute infrastructure 102 with minimal interruption.

Archive system 120 archives data for the computer infrastructure 102. The archive system 120 may be a cloud service. The archive system 120 receives data to be archived from the DMS clusters 112, The archived storage typically is "cold storage," meaning that more time can be spent to retrieve data stored in archive system 120. In contrast, the DMS clusters 112 provide faster data retrieval, such as for backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that operate autonomously to collectively provide the DMS services, including managing and storing data. A DMS node 114 includes a software stack, processor and data storage. DMS nodes 114 can be implemented as physical machines and/or as virtual machines. The DMS nodes 114 are interconnected with each other, for example, via cable, fiber, backplane, and/or network switch. The end user does not interact separately with each DMS node 114 but interacts with the DMS nodes 114a-n collectively as one entity, namely, the DMS cluster 112.

The DMS nodes 114 are peers and preferably each DMS node 114 includes the same functionality. The DMS cluster 112 automatically configures the DNB nodes 114 as new nodes are added or existing nodes are dropped or fail. For example, the DMS cluster 112 automatically discovers new nodes. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, as will be described in more detail in FIG. 2. In the following examples, these are shown as tables, but other data structures could also be used. The data store 118 contains the backup data from the compute infrastructure 102, for example snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, an agent 110 is installed on the physical machines 108 to facilitate DMS services for the physical machines.

The components shown in FIG. 1 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 1 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 2:
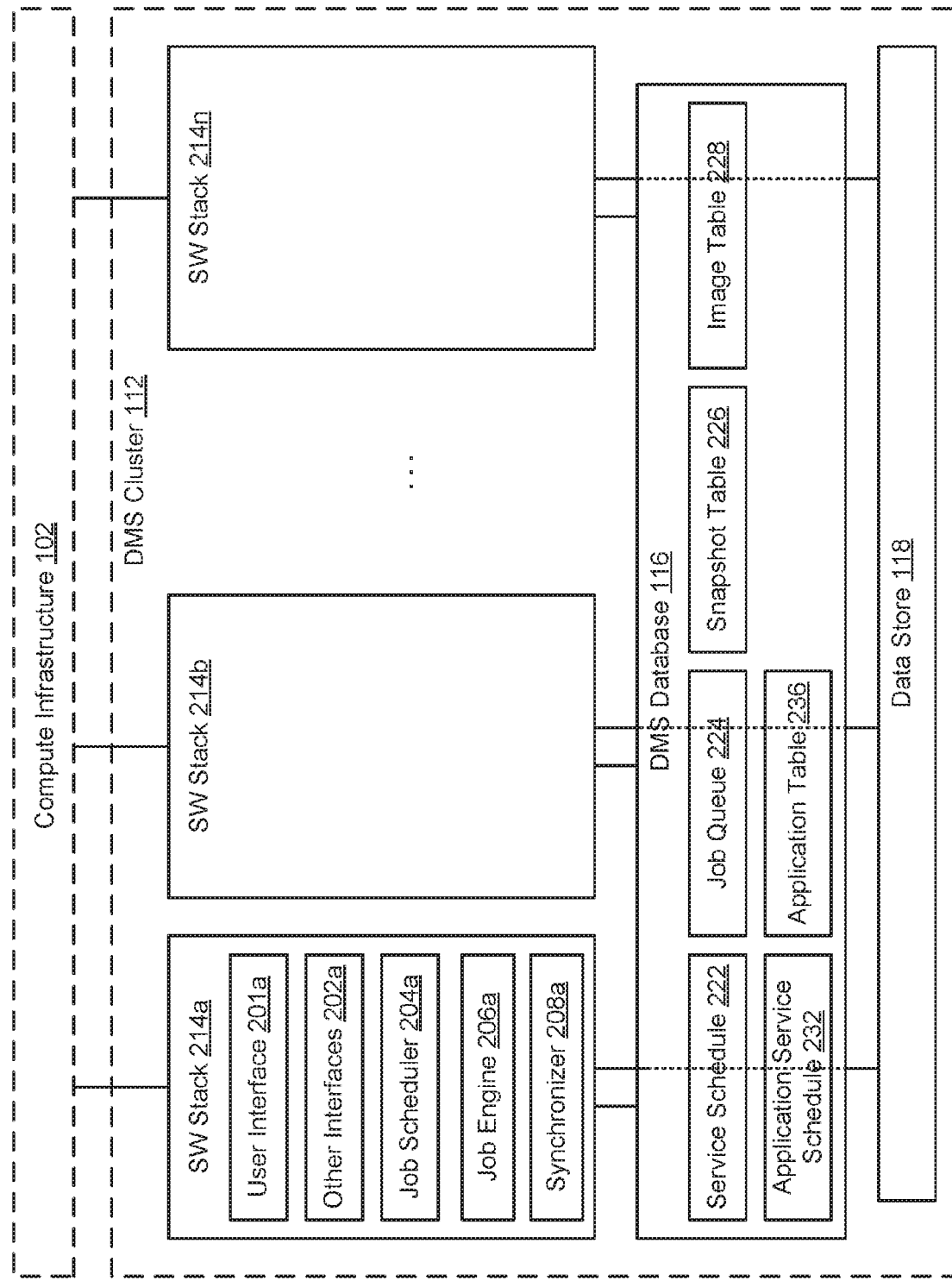
FIG. 2 is a logical block diagram of a data management and storage (DMS) cluster, according to one embodiment.

FIG. 2 is a logical block diagram illustrating an example DMS cluster 112, according to one embodiment. This logical view shows the software stack 214a-n for each of the DMS nodes 114a-n of FIG. 1. Also shown are the DMS database 116 and data store 118, which are distributed across the DMS nodes 114a-n. Preferably, the software stack 214 for each DMS node 114 is the same. This stack 214a is shown only for node 114a in FIG. 2. The stack 214a includes a user interface 201a, other interfaces 202a, job scheduler 204a and job engine 206a. This stack is replicated on each of the software stacks 214b-n for the other DMS nodes. The DMS database 116 includes the following data structures: a service schedule 222, a job queue 224, a snapshot table 226 and an image table 228. In the following examples, these are shown as tables, but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics. In some embodiments, the user interface 201 provides for definition of a set of machines as an application. The DMS cluster 112 may perform synchronized DMS services for the set of machines of the application. Information defining services for applications may be stored in the application service schedule 232. In some embodiments, the application service schedule 232 is integrated with the service schedule 222. The set of machines of the application may include virtual machines, 104, physical machines 108, or combinations of virtual machines 104 and physical machines 108.

The software stack 214 also includes other interfaces 202. For example, there is an interface 202 to the computer infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. In some embodiments, a set of job may be associated with an application and performed synchronously. For example, snapshots may be generated for the set of machines associated with the application to generate a snapshot of the application. Some of these jobs are determined according to the service schedule 222, or the application service schedule 232. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222 or application service schedule 232.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution. In some embodiments, a job scheduler 204 performs a scheduling function to cause the DMS cluster 112 to perform a synchronized DMS service for multiple machines associated with an application.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204*j* from one node might post a job, which is then pulled from the queue and executed by a job engine 206*k* from a different node.

The synchronizer 208 performs a synchronization function for DMS services for multiple machines associated with an application. In particular, the synchronizer 208 may communicate with job engines 206 to ensure that each job associated with the application is ready for execution prior to authorizing execution of the jobs. As such, the job engines 206 allocated to the DMS service for the multiple machines can execute synchronously to generate a snapshot of the application at a particular time.

In some cases, a specific job is assigned to or has preference for a particular DMS node (or group of nodes) to execute. For example, if a snapshot for a VM is stored in the section of the data store 118 implemented on a particular node 114*x*, then it may be advantageous for the job engine 206*x* on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a,b,c. The image table is an index of images to their location in the data store 118. For example, image a is stored at location aaa of the data store 118, image b is stored at location bbb, etc.

The application table 236 is a data structure that indexes the application snapshots captured by the DMS cluster 112. An application snapshot may include a set of snapshots of individual machines. Each of the snapshots associated with the application may also be referenced in the snapshot table 226. In some embodiments, the application table 236 is integrated with the snapshot table 226. More details of example implementations are provided in FIGS. 3, 4, and 5 below.

DMS database 116 also stores metadata information for the data in the data store 118. The metadata information may include file names, file sizes, permissions for files, and various times such as when the file was created or last modified.

FIGS. 3, 4, and 5 illustrate operation of the DMS system shown in FIGS. 1-2. FIGS. 3-4 illustrate management of individual machines of the computer infrastructure, while 5 illustrates management at a higher application level. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that the DMS cluster can find the machine in the compute infrastructure. In this example, there is a mix of virtual machines (VMxx) and physical machines (PMxx). The machines are also identified by machine_id, which is a unique ID used internally by the DM cluster.

The services to be performed are defined in the SLA (service level agreement) column. Here, the different SLAs are identified by text: standard VM is standard service for virtual machines, Each SLA includes a set of DMS policies (e.g., a backup policy, a replication policy, or an archival policy) that define the services for that SLA. For example, "standard VM" might include the following policies:
  Backup policy: The following backups must be available on the primary DMS cluster 112*x*: every 6 hours for the prior 2 days, every 1 day for the prior 30 days, every 1 month for the prior 12 months.
  Replication policy: The backups on the primary DMS cluster for the prior 7 days must also be replicated on the secondary DMS cluster 112*y*.
  Archive policy: Backups that are more than 30 days old may be moved to the archive system 120.
The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job_id identifies a job and start_time is the scheduled start time for the job. job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal trash collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m001. Each row of the snapshot table is a different snapshot and each row of the image table is a different image. The snapshot is whatever is being backed up at that point in time. In the nomenclature of FIG. 3C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "1" indicates this is a full image of the snapshot at time t1. The incremental difference is m001.im1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1, The ss_time is a timestamp of the snapshot, which is Oct. 1, 2017 at 3 am. im_list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

For virtual machines, pulling a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

From time to time, these tables and the corresponding data are updated as various snapshots and images are no longer needed or can be consolidated, FIGS. 4A-4D show an example of this. FIG. 4A shows the snapshot table and image table after backups have been taken for 3 days using the process described in FIG. 3. However, if the service schedule requires 6-hour backups only for the past 2 days, then the 6-hour backups for the first day October 1 are no longer needed. The snapshot m001.ss1 is still needed because the service schedule requires daily backups; but snapshots .ss2, .ss3 and .ss4 can be deleted and are removed from the snapshot table, as indicated by the cross-hatching in FIG. 4B. However, the incremental images .im1-2, .im2-3 and .im3-4 are still required to build the remaining snapshots.

In FIG. 4C, the base image is updated from .im1 to .im5. That is, a full image of snapshot 5 is created from the existing images. This is a new row at the bottom of the image table 228. The im_list for snapshots .ss5 to .ss12 are also updated to stem from this new base image .im5. As a result, the incremental images .im1-2, .im2-3, .im3-4 and .im4-5 are no longer required and they can be deleted from the data store and from the image table 228. However, the data store now contains two full images: .im1 and .im5. Full images are usually much larger than incremental images. This redundancy can be addressed by creating a backwards incremental image .im5-1, shown in FIG. 4D as a new row in the image table 228. With the addition of this backwards incremental image, the full image .im1 is no longer needed.

FIGS. 4A-4D illustrate backup at an individual machine level. FIGS. 5A-5C illustrate backup at an application-level. An application may be implemented across multiple machines. As a result, it is desirable that all of the component machines are backed up approximately at the same time. FIG. 5A is an example of an application service schedule 232. Typically, this service schedule is in addition to the machine-level service schedule of FIG. 3A. The application service schedule 232 defines which services for applications, each defined by a set of machines, should be performed and at what time, Each row of the application service schedule 232 defines the services for a particular application. The application is identified by application_user_id, which is the ID of the application in the compute infrastructure, and by application_id, which is the ID of the application used internally by the DM cluster. The machines of each application may be identified by the machine_id, which is the unique ID used internally by the DM cluster. Furthermore, the services to be performed for each application is defined by the SLA column of the application service schedule 232. In some embodiments, each application may have a single SLA shared with the set of machines of the application. However, the SLAs for machines within an application may vary.

Application APP01 is an application including machines m001, m002, m003, and a "standard application" SLA. Application APP02 includes machines m004, m005, and a "short life" SLA. Application APP03 includes machines m006, m007, and a "high frequency" SLA. Application APP04 includes machines m008, m009, and m001, and a "standard application" SLA. An application SLA may include a collection of SLAs for a set of machines. The SLAs for each machine may be the same or different. In some embodiments, each machine_id is associated with an SLA as shown in the service schedule 222. An application may include two or more machines, and the machines may include virtual machines, physical machines, or combinations of virtual machines and physical machines. Furthermore, two or more applications may share a machine.

FIG. 5B is an example of the job queue 224 of FIG. 3B but modified to include synchronized jobs for applications. Like the job queue 224 in FIG. 3B, each row is a separate job identified by job_id. Furthermore, the job queue 224 may include an application_id column or other identifier to indicate that the job is associated with an application. Jobs 00001 through 00003 are jobs associated with the application APP01. These jobs may share a common job_type, as well as a common start_time such that the jobs associated with the application are synchronized. Jobs 00010 through 00011 are jobs associated with the application APP02, and also share the same start_time and job_type. In some embodiments, the jobs of an application may include different job types. Job_info includes additional information for the job, such as the machine_id for the job. Jobs may be added to the jobs queue 224 based on the service schedule 222, the application service schedule 232, or both.

FIG. 5C is an example of an application snapshot table 236, illustrating backups for an application. The rows in the application table indicate the relations between application snapshots and the individual machine snapshots that form the application snapshots. The nomenclature for snapshots discussed above for the snapshot table 226 may be applicable to the application table 236. For example, app001.ss1 is a snapshot of an application app001 taken at time t1. Furthermore, snapshots m001.ss1, m002.ss1, and m003.ss1 are snapshots of machines m001, m003, and m003 associated with the application taken at the time t1. The ss_time is a timestamp of the snapshots, which should be the same time or close in time for each of the snapshots associated with the application. Furthermore, snapshot_child_list defines for each application the set of machines associated with the application. Snapshot_parent_list defines for each machine the application to which the machine belongs. App001.ss2 is a snapshot of the application taken at a time t2. Snapshots m001.ss2, m002.ss2, and m003.ss2 are snapshots of machines m001, m003, and m003 associated with the application taken at the time t2.

The snapshots of the machines may be full snapshots or incremental snapshots, as may be defined in the snapshot table 226 of FIG. 3C. In some embodiments, each machine-level snapshot associated with an application may be defined with reference to a snapshot table 226 and image table 228, as shown in FIG. 3C. In some embodiments, the application snapshot table 236 is integrated with the snapshot table 226. For example, the application snapshot table 236 may include an im list to define images of the snapshots associated the application. In some embodiments, the application table 236 lists only application snapshots with references to snapshots of individual machines stored in the snapshot table 226.

The description above is just one example. The various data structures may be defined in other ways and may contain additional or different information.

in some embodiments, the DMS clusters 112 provide DMS services for a set of machines, such as VMs 104 and/or PMs 108, which implement an application. The DMS services may include backup, recovery, replication, archival, and analytics services. For example, an application may include one or more database servers, file servers, and web servers distributed across multiple machines. The DMS clusters 112 performs synchronized data fetch jobs for the set of machines in the application.

Figure 6:
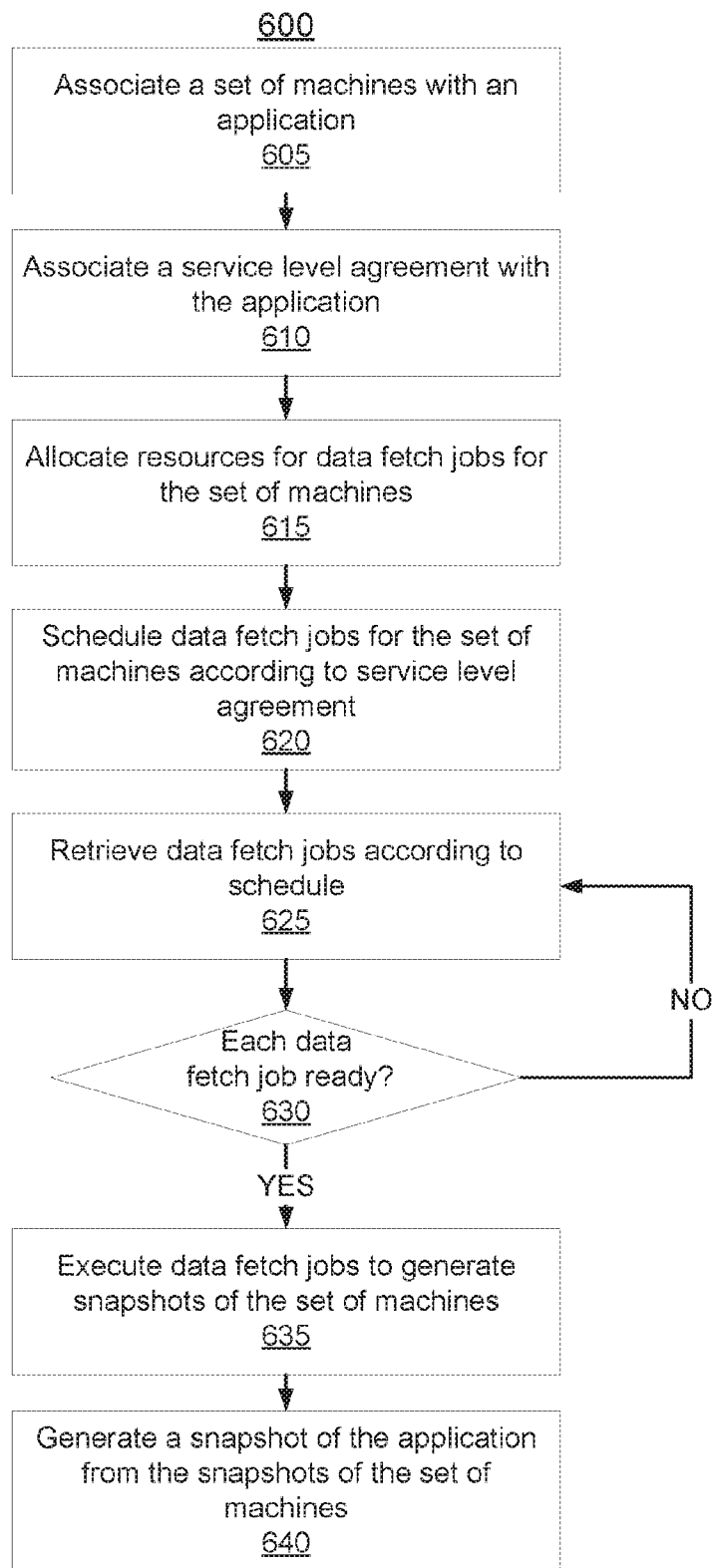
FIG. 6 is a flow chart of a process for managing data for an application, according to one embodiment.

FIG. 6 is a flow chart of a process 600 for generating a snapshot of an application, according to one embodiment. The snapshot of the application refers to synchronized snapshots of multiple machines associated with the application. The process 600 is discussed as being performed by DMS cluster 112, although other types of computing structures may be used. In some embodiments, the process 600 may include different and/or additional steps, or some steps may be in different orders.

A DMS cluster 112 (e.g., the job scheduler 204a of a DMS node 114a) associates 605 a set of machines with an application. For example, a user of the compute infrastructure 102 may access the DMS cluster 112 via user interface 201 to define the machines associated with the application in the compute infrastructure 102. Furthermore, the user interface 201 may be used to define what services should be performed at what time for the machines associated with the application.

In some embodiments, the job scheduler 204a stores the association between the set of machines with the application using an application service schedule 232. For example, the application service schedule 232 may store in each row an application as identified by application_id, multiple machines associated with the application as identified by machine_user_id and/or machine_id, and the SLA(s) associated with the multiple machines. As discussed above, the machine_user_id refers to the ID of the machine in the compute infrastructure 102, while the machine_id refers to a unique ID used internally by the DM cluster 112.

The DMS cluster 112 (e.g., the job scheduler 204a) associates 610 one or more SLAs associated with the application. The services to be performed on each of the machines of the application are defined in the SLA. In some embodiments, the same SLA is associated with each of the set of machines of the application. In other embodiments, different machines may be associated with different SLAs, such as different backup (or "data fetch"), replication, or archive policies. In some embodiments, each of the machines may share the same backup policy in terms of frequency to synchronize the backup of the application but include different replication or archive policies. In some embodiments, the job scheduler 204a stores the SLA in association with the application within a row of the service schedule 232.

The DMS cluster 112 (e.g., the job scheduler 204a) allocates 615 processing and storage resources for data fetch jobs for the set of machines. For example, the job scheduler 204a may perform an automated discovery operation to determine the machines, files, etc. of the application, and uses this information to determine the amount of processing and storage resources needed for allocation to the job. To perform multiple data fetch jobs for the machines of the application at the same or substantially the same time, the job scheduler 204a may allocate a minimal amount of the processing resources of the DNS nodes 114 and the storage resources of the data store 118. In some embodiments, the job scheduler 204a may define or update the size of the DMS cluster 112 by associating multiple DMS nodes 114 needed to perform the jobs with the DMS cluster 112. The amount of resources allocated may vary, for example, based on the number of machines of the application, the amount of data to be transferred, or the amount of DMS nodes 114 authorized for a user or compute infrastructure 102.

The DMS cluster 112 (e.g., the job scheduler 204a) schedules 620 the data fetch jobs for the set of machines according to the SLA. For example, the job scheduler 204a populates the job queue 224 with data fetch jobs for the machines of the application according to the application service schedule 232, Each data fetch job for a machine may be a separate row in the job queue 224. Each job may be identified by the job_id and may be associated with a start_time defining the scheduled start time for the job. The type of job may be defined by job_type, which for a data fetch job may be specified as "pull snapshot." Additional information regarding each job may be defined by job_info, such as the machine_id of the machine. In some embodiments, each job may further be associated with the application as defined by application_id in the jobs queue 224. The application_id indicates the application associated with job, and multiple job_ids may be associated with the same application id to indicate a job belongs to an application and thus should be synchronized with other jobs of the application that share the application_id in the jobs queue 224.

The DMS cluster 112 (e.g., the job engine 206 of one or more DMS nodes 114 of the DMS cluster 112) retrieves the data fetch jobs according to the schedule. For example, the job engine 206 of multiple DMS nodes 114 may monitor the jobs queue 224, and retrieve the jobs associated with the application from the job queue for execution at the defined start time. In some embodiments, each job engine 206 may retrieve one of the jobs defined in a row of the job queue. In some embodiments, each DMS node 114 allocates processing and memory resources needed to execute the job. If resources are unavailable, the DMS node 114 may determine that its retrieved job fails to be ready for execution.

The DMS cluster 112 (e.g., a synchronizer 208a of the DMS node 114a) determines 630 whether each of the data fetch jobs associated with the application is ready for execution. The data fetch jobs may be determined as ready for execution when each of the jobs associated with the application has been retrieved by a job engine 206 from the jobs queue 224, or when the jobs engines 206 is otherwise ready to execute the data fetch jobs (e.g., in parallel, at the defined start time). In some embodiments, each job engine 206 of multiple DMS nodes 114 that has retrieved a job associated with the application or is otherwise ready to execute the job sends a message to the synchronizer 208a. The synchronizer 208a may determine that a message has been received for each of the jobs associated with the application and may send a message to each of the job engines 206 that enables job execution. In some embodiments, the synchronizer 208a may monitor the jobs queue 224 to determine each of the jobs associated with the application have been retrieved from the jobs queue 224, and then enables the job execution when each of the jobs associated with the application have been retrieved from the jobs queue 224.

In response to determining that at least one of the data fetch jobs fail to be ready for execution, the DMS cluster 112 (e.g., the job engines 206) retrieves 625 remaining data fetch jobs. In some embodiments, the synchronizer 208a may delay execution of the data fetch jobs until each of the data fetch jobs is ready for execution. The synchronizer 208a may wait until a message has been received for each of the jobs associated with the application before enabling each of the job engines 206 to execute their job. In some embodiments, the synchronizer 208a may allocate additional resources, such as an additional DMS node 114, for a scheduled job that has caused delay in the parallel job execution.

In response to determining that each of the data fetch jobs is ready for execution, the DMS cluster 112 (e.g., the job engines 206 of multiple DMS nodes 114) executes 635 the data fetch jobs to generate snapshots of the set of machines. The job engines 206 of multiple DMS nodes 114 may generate the snapshots of the machines of the application in parallel (e.g., as defined by the shared start time for the jobs) by capturing data from the compute infrastructure 102 to generate a synchronous snapshot of the application. Each job engine 206 may freeze a machine and take the snapshot of the machine, transferring the snapshot (or the incremental differences), and release the machine. As the needed resources for each of the fetch jobs has been allocated, and each of the job engines 206 has retrieved a respective job of the application for execution, the snapshots of the machines are synchronized. Furthermore, the reliability of the jobs is increased.

The DMS cluster 112 (e.g., the job engines 206) generates 640 a snapshot of the application from the snapshots of the set of machines. The snapshots of the set machines may include full images, incremental images, or combinations of full and incremental images. Furthermore, the snapshot of the application including the snapshots of the set of machines in a distributed data store, such as the data store 118. In some embodiments, the DMS cluster 112 generates the snapshot of the application by associating the snapshots of the set of machines with the application in an application snapshot table 236. Furthermore, each snapshot and its corresponding image(s) may be defined in the snapshot table 226 and the image table 228.

Although the process 600 is discussed with respect to data fetch jobs, other types of synchronized jobs for multiple machines may be performed using the process 600. As discussed above, the DMS cluster 112 is not limited to backup or data fetch jobs, and may also provide other DMS services including recovery, replication, trash collection, archival, and analytics services. Furthermore, the process 600 may be repeated to generate multiple snapshots of the application. Jobs for each snapshot of the application may be placed in the jobs queue 224 and retrieved by DMS nodes to execute the jobs. Each of the DMS nodes 114 may be "peers," and the DMS services for particular machines may be processed by different DMS nodes 114 of the DMS cluster 112 (e.g., for different application snapshots). In some embodiments, the process 600 may be performed to provide synchronized DMS services for other groups of machines other than machines for an application.

Figure 7:
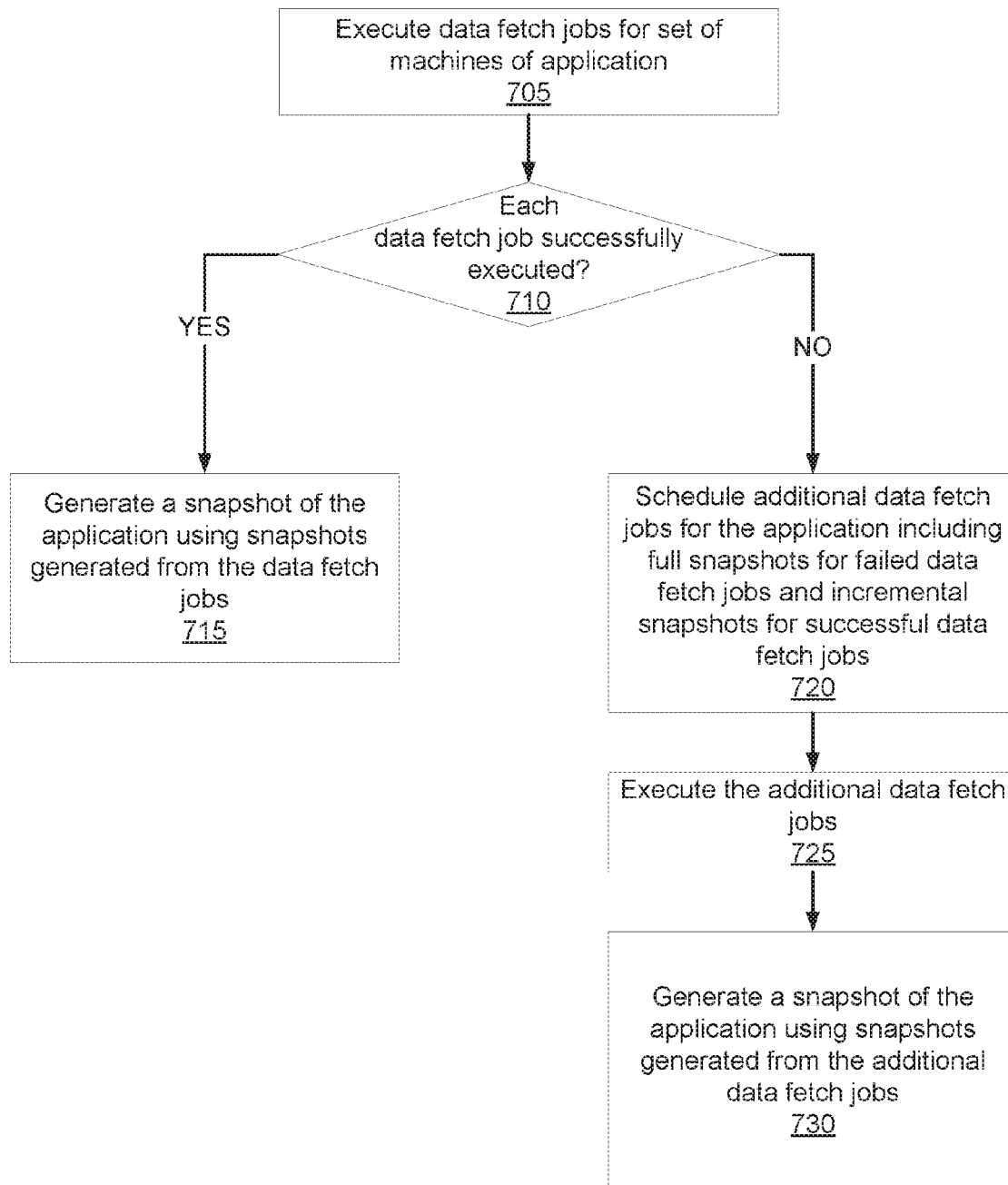
FIG. 7 is a flow chart of a process for generating a snapshot of an application using full and incremental snapshots, according to one embodiment.

FIG. 7 is a flow chart of a process 700 for generating a snapshot of an application, according to one embodiment. The process 700 may include performing additional data fetch jobs for an application when at least one of the data fetch jobs fail to successfully execute. In the additional data fetch jobs, a synchronized snapshot of the application is generated using incremental snapshots for machines associated with previously successfully data fetch jobs, and full snapshots for machines associated with previously failed data fetch. The process 700 is discussed as being performed by DMS cluster 112, although other types of computing structures may be used. In some embodiments, the process 700 may include different and/or additional steps, or some steps may be in different orders.

The DMS cluster 112 (e.g., the job engines 206) executes 705 data fetch jobs associated with an application. The discussion at 635 of the process 600 may be applicable at 705.

The DMS cluster 112 (e.g., the job scheduler 204a or the synchronizer 208a) determines 710 whether each of the data fetch jobs of the application has successfully executed. A data fetch job for the application may be determined as successfully executed when a snapshot of each of the set of machines associated with the application has been successfully generated. These data fetch jobs may include captures of full snapshots (e.g., when no prior full snapshot exists, or when a full capture is otherwise desired) or incremental snapshots. However, one or more of the snapshots may fail for various reasons. For example, the freezing machine operation to prepare a machine for snapshot capture may fail, or a hardware or software of the DMS cluster 112 may fail, or a network connection between the DMS duster 112 and the compute infrastructure 102 may fail.

In response to determining that each of the jobs of the application has successfully executed, the DMS cluster 112 generates 715 a snapshot of the application using the snapshots of the set of machines generated from the data fetch jobs. For example, the DMS cluster 112 associates the snapshots of the set of machines with the application by updating an application snapshot table 236. These snapshots, which may include hill or incremental snapshots of the set of machines, are incorporated with the snapshot of the application for the defined time (e.g., as specified by start_time in the job queue 224).

In response to determining that a data fetch job of the application has failed to successfully execute, the DMS cluster 112 (e.g., the job scheduler 204a or the synchronizer 208a) schedules 720 additional data fetch jobs for the application including a full snapshot for machines associated with the data fetch jobs that failed and incremental snapshots for other machines associated with the data fetch jobs that succeeded in the execution at step 705.

The DMS cluster 112 (e.g., job engine 206 of one or more DMS nodes 114 of the DMS cluster 112) executes 725 the additional data fetch jobs. The discussion for generating a snapshot of the application discussed above in connection with the process 600 may be applicable at 720 and 720, For example, the synchronizer 208a may ensure that all data fetch jobs of the application have been retrieved by DMS nodes 114. Execution of the additional data fetch jobs, if successful, results in the full snapshots for the machines associated with the data fetch jobs that previously failed and incremental snapshots for the machines associated with the data fetch jobs that previously succeeded.

The DMS cluster 112 (e.g., job engine 206 of one or more DMS nodes 114) generates 730 the snapshot of the application using snapshots generated from the additional data fetch jobs. For example, the DMS cluster 112 associates the snapshots generated from the additional data fetch jobs with the application by updating an application snapshot table 236. The snapshot of the application is generated using full snapshots for the machines associated the data fetch jobs that previously failed, the full snapshots for the other machines associated with the data fetch jobs that previously succeeded, and the incremental snapshots for the other machines associated with the data fetch jobs that previously succeeded. The snapshot for the machines associated with data fetch jobs that previously succeeded may each include the (e.g., full or incremental) snapshot previously captured combined with the incremental snapshot captured in the additional data fetch jobs. The snapshot for the machines associated with data fetch jobs that previously failed each include the full snapshot captured in the additional data fetch jobs. As such, a synchronized snapshot of the application may be generated for each of set of machines of the an application using the additional data fetch jobs.

In some embodiments, rather than capturing a full snapshot for each machine associated with a data fetch job that previously failed, the DMS cluster 112 may generate an incremental snapshot based on a prior successful full snapshot, or a prior successful incremental snapshot. Furthermore, the various operations associated with incremental snapshots discussed herein may be performed on the snapshots of the set of machines that form the snapshot of the application, such as so long as the snapshots of the machines remains synchronized. The operations on the snapshots may include consolidating multiple incremental snapshots, deleting unneeded snapshots or incremental snapshots, etc.

The process 700 may be repeated. For example, if the current synchronized data fetch job for the application results in one or more failed data fetch job executions, then the process 700 may be repeated to perform a subsequent synchronized data fetch job where the DMS cluster 112 captures a full snapshot for the failed data fetch jobs in the current synchronized data fetch job, and incremental snapshots of the successful data fetch jobs in the current synchronized data fetch job.

Figure 8:
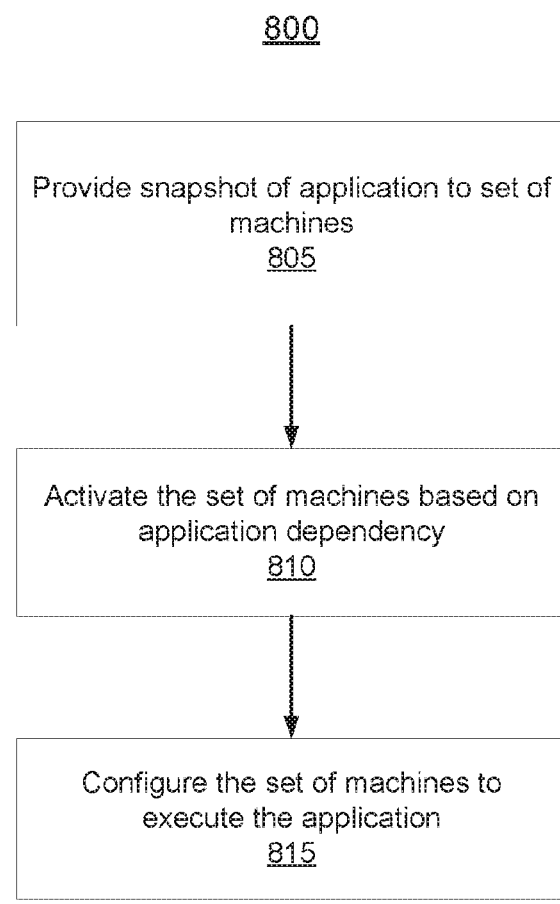
FIG. 8 is a flow chart of a process for recovering an application to a compute infrastructure, according to one embodiment.

FIG. 8 is a flow chart of a process 800 for recovering an application to a compute infrastructure, according to one embodiment. The process 800 is discussed as being performed by DMS cluster 112, although other types of computing structures may be used. In some embodiments, the process 800 may include different and/or additional steps, or some steps may be in different orders.

The DMS cluster 112 (e.g., job engine 206 of one or more DMS nodes 114) provides 805 a snapshot of an application to a set of machines. The set of machines may be same machines of the compute infrastructure 102 from which the snapshots of the machines were captured or may be different machines. In some embodiments, the application includes database servers, file servers, web servers, or other types of servers located across the set of machines. Each machine may contain one or more servers. In some embodiments, providing the snapshot of the application is performed by placing jobs including a "recovery" job_type in the jobs queue for processing by peer DMS nodes 114 of the DMS cluster 112. The discussion regarding scheduling and executing the data fetch task in the process 600 may be applicable to the recovery job.

The DMS cluster 112 may provide the snapshot of the application to the compute infrastructure 102 from the data store 118 of the DMS cluster 112, the data store 118 of another DMS cluster 112, or a data store of the archive system 120, or some other location where the snapshots of the set of machines may be stored. In some embodiments, a single DMS cluster 112 may provide the snapshot of the application to the set of machines. However, additional DMS clusters 112 may be used (e.g., in parallel) to increase the speed of the recovery job.

The set of machines are activated 810 based on application dependency. For example, the web servers may depend on the file servers, and the file servers may depend on the database servers. As such, the machines including database servers may be activated first, the machines including file servers activated second, and the machines including web server activated third. The application dependency and types of servers may vary. In some embodiments, the application dependency may be stored in the DMS database 116 as metadata information, or some other location in the DMS cluster 112. As described above, automated techniques can be used to determine which machines are used to service an application, and what order they should be restored due to dependencies.

The set of machines are configured 815 to execute the application. For example, Internet Protocol (IP) addresses and other networking information may be assigned to each of the machines. In another example, a machine may execute a script to change content within the machine.

Figure 9:
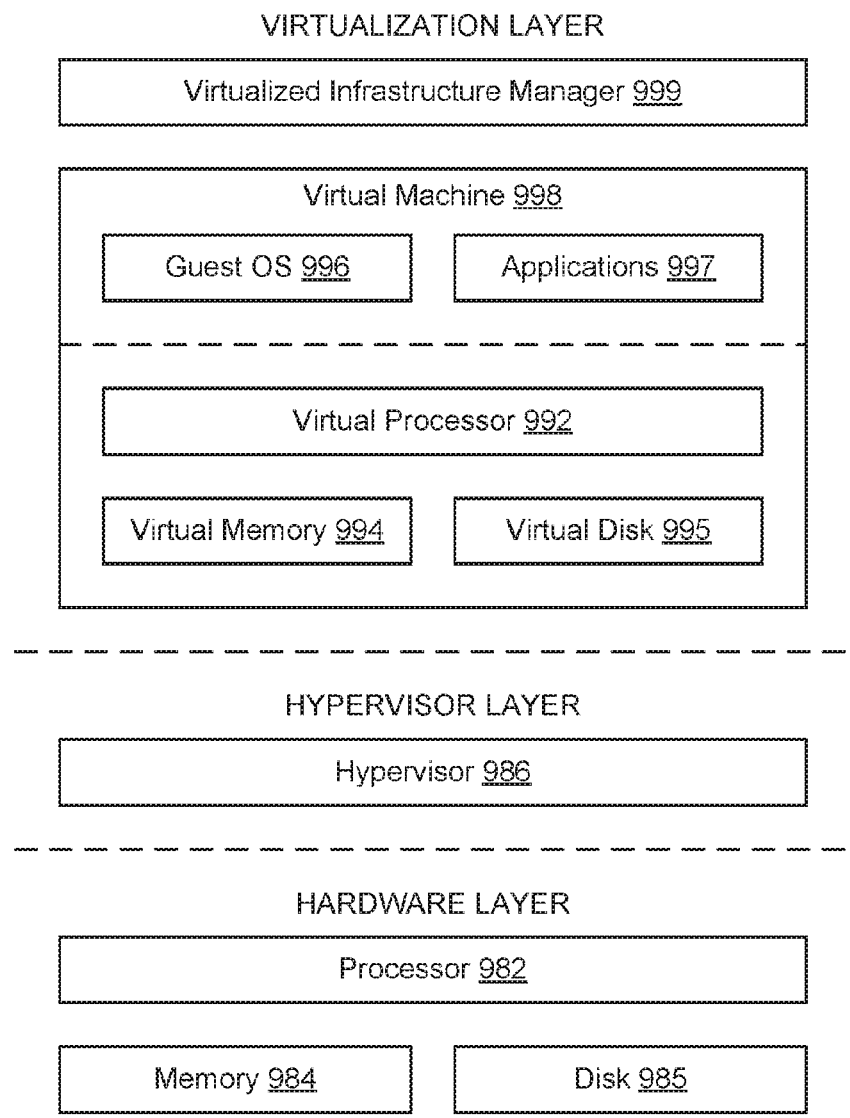
FIG. 9 is a block diagram of a virtual machine, according to one embodiment.

FIG. 9 is a block diagram of a server for a VM platform, according to one embodiment. The server includes hardware-level components and software-level components. The hardware-level components include one or more processors 982, one or more memory 984, and one or more storage devices 985. The software-level components include a hypervisor 986, a virtualized infrastructure manager 999, and one or more virtual machines 998. The hypervisor 986 may be a native hypervisor or a hosted hypervisor. The hypervisor 986 may provide a virtual operating platform for running one or more virtual machines 998. Virtual machine 998 includes a virtual processor 992, a virtual memory 994, and a virtual disk 995. The virtual disk 995 may comprise a file stored within the physical disks 985. In one example, a virtual machine may include multiple virtual disks, with each virtual disk associated with a different file stored on the physical disks 985. Virtual machine 998 may include a guest operating system 996 that runs one or more applications, such as application 997. Different virtual machines may run different operating systems. The virtual machine 998 may load and execute an operating system 996 and applications 997 from the virtual memory 994. The operating system 996 and applications 997 used by the virtual machine 998 may be stored using the virtual disk 995. The virtual machine 998 may be stored as a set of files including (a) a virtual disk file for storing the contents of a virtual disk and (b) a virtual machine configuration file for storing configuration settings for the virtual machine. The configuration settings may include the number of virtual processors 992 (e.g., four virtual CPUs), the size of a virtual memory 994, and the size of a virtual disk 995 (e.g., a 10 GB virtual disk) for the virtual machine 995.

The virtualized infrastructure manager 999 may run on a virtual machine or natively on the server. The virtualized infrastructure manager 999 corresponds to the virtualization module 106 above and may provide a centralized platform for managing a virtualized infrastructure that includes a plurality of virtual machines. The virtualized infrastructure manager 999 may manage the provisioning of virtual machines running within the virtualized infrastructure and provide an interface to computing devices interacting with the virtualized infrastructure. The virtualized infrastructure manager 999 may perform various virtualized infrastructure related tasks, such as cloning virtual machines, creating new virtual machines, monitoring the state of virtual machines, and facilitating backups of virtual machines.

Figure 10:
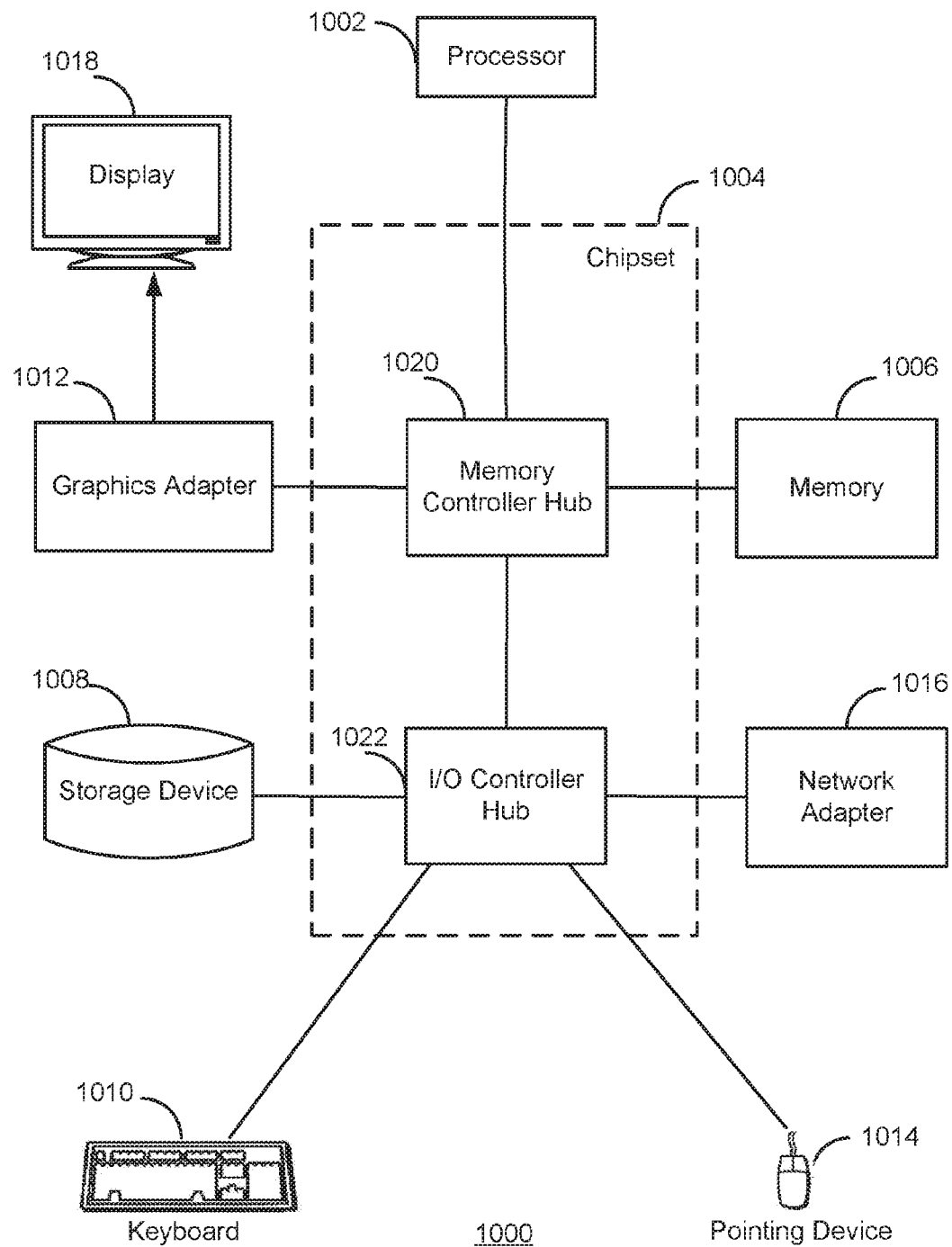
FIG. 10 is a block diagram of a computer system suitable for use in a DMS system, according to one embodiment.

FIG. 10 is a high-level block diagram illustrating an example of a computer system 1000 for use as one or more of the components shown above, according to one embodiment. Illustrated are at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 1020, and a display device 1018 is coupled to the graphics adapter 1012. A storage device 1008, keyboard 1010, pointing device 1014, and network adapter 1016 are coupled to the 1/0 controller hub 1022. Other embodiments of the computer 1000 have different architectures. For example, the memory 1006 is directly coupled to the processor 1002 in some embodiments.

The storage device 1008 includes one or more non-transitory computer-readable storage media such as a hard drive, compact disk read-only memory (CD-ROM), DVD, or a solid-state memory device. The memory 1006 holds instructions and data used by the processor 1002. The pointing device 1014 is used in combination with the keyboard 1010 to input data into the computer system 1000. The graphics adapter 1012 displays images and other information on the display device 1018. In some embodiments, the display device 1018 includes a touch screen capability for receiving user input and selections. The network adapter 1016 couples the computer system 1000 to a network. Some embodiments of the computer 1000 have different and/or other components than those shown in FIG. 10. For example, the virtual machine 102, the physical machine 104, and/or the DMS node 110 in FIG. 1 can be formed of multiple blade servers and lack a display device, keyboard, and other components.

The computer 1000 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 1008, loaded into the memory 1006, and executed by the processor 1002.

The above description is included to illustrate the operation of certain embodiments and is not meant to limit the scope of the present disclosure. The scope of the present disclosure is to be limited only by the following claims. From the above discussion, many variations will be apparent to one skilled in the relevant art that would yet be encompassed by the spirit and scope of the claimed subject matter.

The invention claimed is:

1. A method for developing a recovery plan for machines in a compute infrastructure, the method comprising:
   collecting, by one or more processors, statistics on network connections between machines in the compute infrastructure, wherein collecting statistics on network connections between machines in the compute infrastructure includes sampling virtual machines executing on the machines in the compute infrastructure at periodic intervals, and accessing a list of established and listening ports of the compute infrastructure to produce raw network flow data at a machine level, the raw network flow data collected in an identified format, the identified format including:
      for listening ports [local port] [process name]; and
      for established connections [source IP address] [source port] [local port] [process name]:
   based on the collected statistics, determining, by the one or more processors, dependencies between the machines in the compute infrastructure;
   constructing, by the one or more processors, a dependency graph of the dependencies of the machines based on the raw network flow data, wherein a directed edge in the dependency graph represents a dependency between two machines in the compute infrastructure, and wherein the directed edge in the dependency graph represents a strength of the dependency and a confidence level that the directed edge is an actual dependency between two machines in the compute infrastructure; and
   based on the dependencies, by the one or more processors, developing a recovery plan for the machines in the compute infrastructure, the recovery plan including an order of recovery for the machines.

2. The method of claim 1, wherein nodes in the dependency graph represent individual machines in the compute infrastructure.

3. A system for recovering machines in a compute infrastructure, the system comprising:
   processors; and
   a memory storing instructions that, when executed by at least one processor among the processors, cause the system to perform operations comprising, at least:
      collecting statistics on network connections between machines in the compute infrastructure, wherein collecting statistics on network connections between machines in the compute infrastructure includes sampling virtual machines executing on the machines in the compute infrastructure at periodic intervals, and accessing a list of established and listening ports in the compute infrastructure to produce raw network flow data at a machine level the raw network flow data collected in an identified format, the identified format including:
         for listening ports [local port] [process name]; and
         for established connections [source IP address] [source port] [local port] [process name];
      based on the collected statistics, determining dependencies between the machines in the compute infrastructure;
      constructing, by the one or more processors, a dependency graph of the dependencies of the machines based on the raw network flow data, wherein a directed edge in the dependency graph represents a dependency between two machines in the compute infrastructure, and wherein the directed edge in the dependency graph represents a strength of the dependency and a confidence level that the directed edge is an actual dependency between two machines in the compute infrastructure; and based on the dependencies, developing a recovery plan for the machines in the compute infrastructure, the recovery plan including an order of recovery for the machines.

4. The system of claim 3, wherein nodes in the dependency graph represent individual machines in the compute infrastructure.

5. A non-transitory machine-readable medium including instructions which, when read by a machine, cause the machine to perform operations including, at least:

collecting statistics on network connections between machines in the compute infrastructure, wherein collecting statistics on network connections between machines in the compute infrastructure includes sampling virtual machines executing on the machines in the compute infrastructure at periodic intervals, and accessing a list of established and listening ports in the compute infrastructure to produce raw network flow data at a machine level, the raw network flow data collected in an identified format, the identified format including:

for listening ports [local port] [process name]; and
for established connections [source IP address] [source port] [local port] [process name];

based on the collected statistics, determining dependencies between the machines in the compute infrastructure;

constructing, by the one or more processors, a dependency graph of the dependencies of the machines based on the raw network flow data, wherein a directed edge in the dependency graph represents a dependency between two machines in the compute infrastructure, and wherein the directed edge in the dependency graph represents a strength of the dependency and a confidence level that the directed edge is an actual dependency between two machines in the compute infrastructure and based on the dependencies, developing a recovery plan for the machines in the compute infrastructure, the recovery plan including an order of recovery for the machines.

6. The medium of claim 5 wherein nodes in the dependency graph represent individual machines in the compute infrastructure.

* * * * *

UNITED STATES PATENT AND TRADEMARK OFFICE
CERTIFICATE OF CORRECTION

PATENT NO. : 10,901,859 B2
APPLICATION NO. : 16/287087
DATED : January 26, 2021
INVENTOR(S) : Di Wu It is certified that error appears in the above-identified patent and that said Letters Patent is hereby corrected as shown below:

In the Specification

Column 1, Line 36, delete "Azure." and insert --Azure,-- therefor

Column 4, Line 4, delete "duster" and insert --cluster-- therefor

Column 4, Line 9, delete "possible," and insert --possible.-- therefor

Column 4, Line 37, delete "used," and insert --used.-- therefor

Column 4, Line 45, delete "112," and insert --112.-- therefor

Column 4, Line 67, delete "DNB" and insert --DMS-- therefor

Column 8, Line 8, delete "5" and insert --FIG. 5-- therefor

Column 8, Line 25, delete "SL As" and insert --SLAs-- therefor

Column 8, Line 27, delete "machines," and insert --machines.-- therefor

Column 9, Line 18, delete "m001.ss1," and insert --m001.ss1.-- therefor

Column 9, Line 44, delete "consolidated," and insert --consolidated.-- therefor

Column 9, Line 51, delete "backups;" and insert --backups,-- therefor

Column 10, Line 13, delete "time," and insert --time.-- therefor

Column 11, Line 28, delete "in" and insert --In-- therefor

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,901,859 B2

Column 12, Line 24, delete "DNS" and insert --DMS-- therefor

Column 12, Line 38, delete "232," and insert --232.-- therefor

Column 14, Line 44, delete "duster" and insert --cluster-- therefor

Column 14, Line 53, delete "hill" and insert --full-- therefor

Column 15, Line 2, delete "720," and insert --720.-- therefor

Column 17, Line 3, delete "995." and insert --998.-- therefor

Column 17, Line 29, delete "1/0" and insert --I/O-- therefor

Column 17, Line 48, delete "102," and insert --104,-- therefor

Column 17, Line 48, delete "104," and insert --108,-- therefor

In the Claims

Column 18, Line 17, Claim 1, delete "name]:" and insert --name];-- therefor

Column 18, Line 52, Claim 3, delete "level" and insert --level,-- therefor

Column 20, Lines 15-16, Claim 5, delete "infrastructure" and insert --infrastructure;-- therefor